J. JOHNSON.
RESILIENT WHEEL.
APPLICATION FILED NOV. 25, 1916. RENEWED MAR. 1, 1918.
1,269,187.
Patented June 11, 1918.
2 SHEETS—SHEET 1.
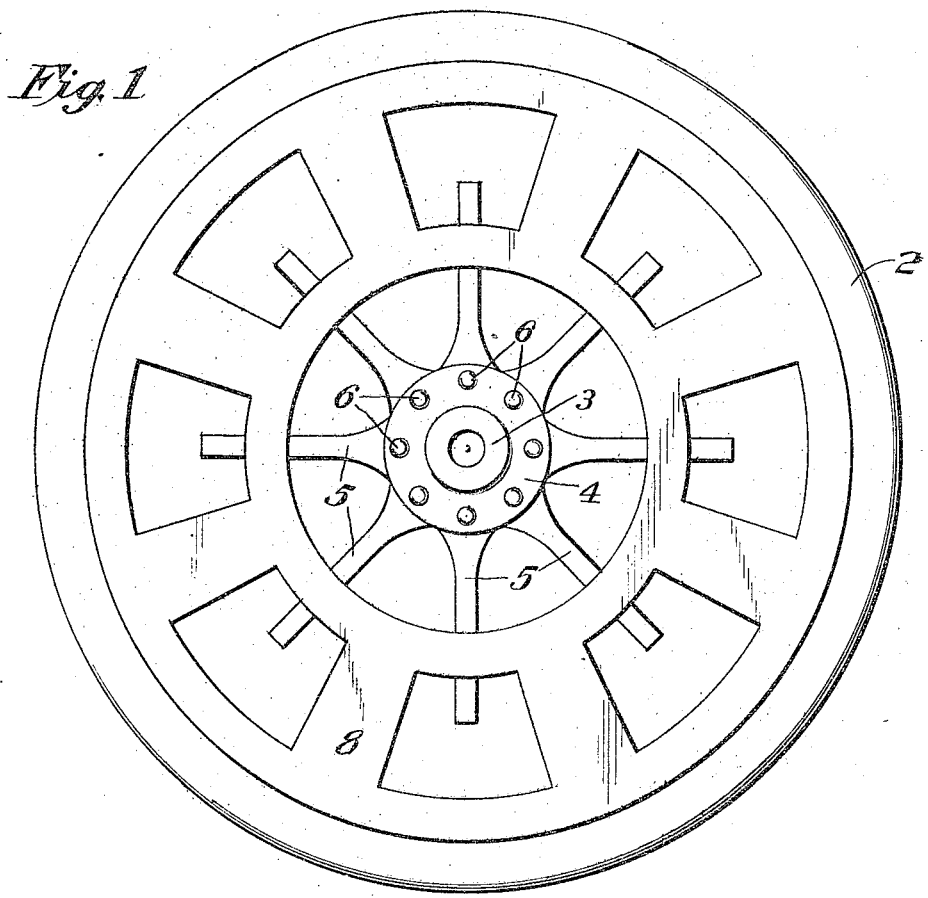
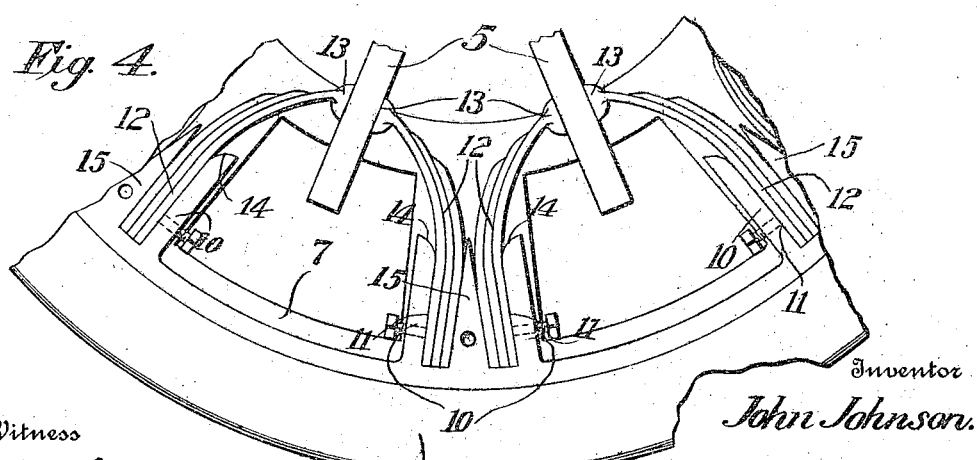
Witness
R. E. Rousseau
P. M. Smith
Inventor
John Johnson.
By Victor J. Evans
Attorney J. JOHNSON.
RESILIENT WHEEL.
APPLICATION FILED NOV. 25, 1916. RENEWED MAR. 1, 1918.

1,269,187.

Patented June 11, 1918.
2 SHEETS—SHEET 2.

Witness
R. E. Rousseau
P. M. Smith

Inventor
John Johnson
By Victor J. Evans
Attorney

UNITED STATES PATENT OFFICE.

JOHN JOHNSON, OF HONOLULU, TERRITORY OF HAWAII.

RESILIENT WHEEL.

1,269,187. Specification of Letters Patent. Patented June 11, 1918.

Application filed November 25, 1916, Serial No. 133,417. Renewed March 1, 1918. Serial No. 219,870.

*To all whom it may concern:*

Be it known that I, JOHN JOHNSON, a citizen of the United States, residing at Honolulu, in the Territory of Hawaii, have invented new and useful Improvements in Resilient Wheels, of which the following is a specification.

This invention relates to resilient wheels the broad object in view being to do away with the present-day pneumatic tire and the troubles and delays incident to the use thereof and to produce in lieu thereof a wheel embodying a novel construction whereby the ordinary road shocks and vibrations are absorbed by the wheel itself and prevented from being transmitted to the axle and body of the vehicle.

A further object in view is to produce a wheel of such construction that the several yieldable centering and sustaining members may be readily removed and replaced in case of breakage, thus enabling the wheel to be maintained in perfect operative condition at small expense.

Another object in view is to produce a wheel embodying in connection with a rim, a resiliently supported hub member, and means for limiting the relative play or movement between the hub and rim so that the wheel as a whole may be used as a driving wheel as well as an idle or steering wheel.

With the above and other objects in view, the invention consists in the novel construction, combination and arrangement, herein fully described, illustrated and claimed.

In the accompanying drawings;

Figure 1 is a side elevation of a complete wheel embodying the present invention.

Fig. 4 is an enlarged fragmentary elevation of the same with the adjacent side plate removed.

Figure 2:
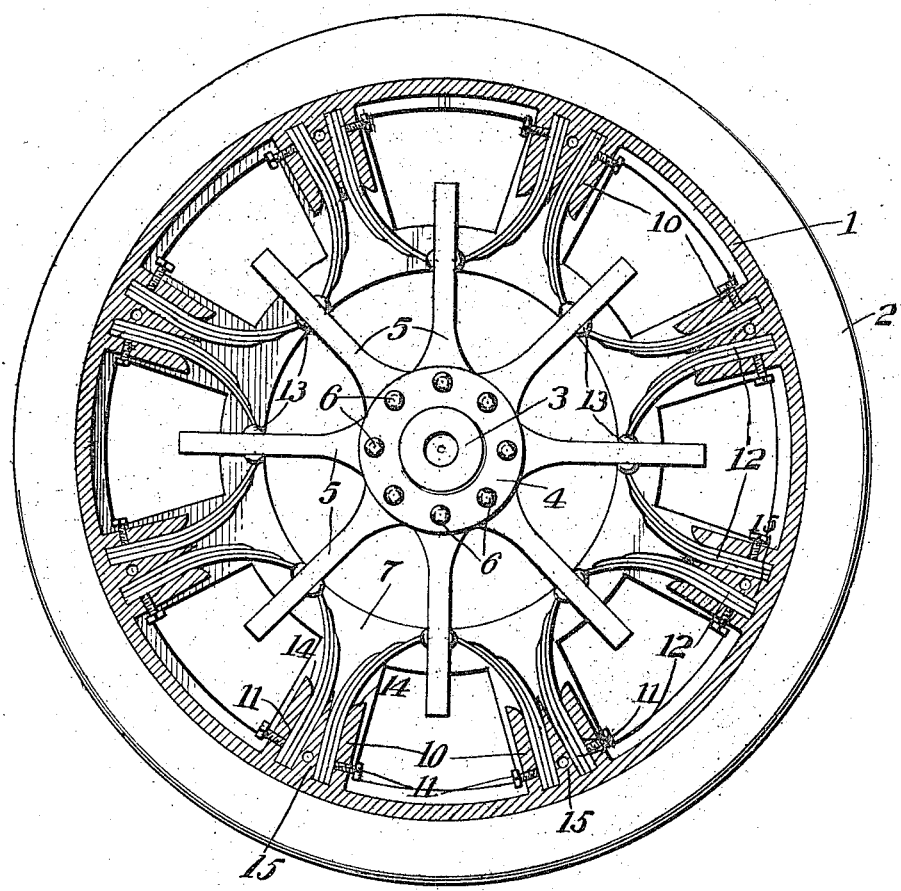
Fig. 2 is a side elevation of the wheel with one of the side plates removed, the rim being shown in section.
Figure 3:
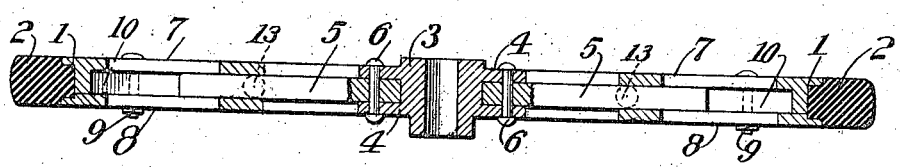
Fig. 3 is a diametrical section through the wheel.

Referring to the drawings 1 designates the wheel rim and 2 an ordinary tire mounted thereon. This tire may be either of the solid or cushion type and is preferably composed of rubber, although it will be understood that a tire of any description may be mounted on the rim 1.

The hub 3 is formed with disk shaped flanges 4 arranged in spaced relation to each other, between which the expanded inner ends of the spokes 5 are positioned, the spokes being fastened in rigid relation to each other and to the hub flanges 4 by means of bolts 6.

The spokes 5 extend radially toward the rim 1 but terminate at a considerable distance therefrom as shown in Fig. 2. The outer end portions of the spokes are slidable between annular housing plates 7 and 8 which overlap the end portions of the spokes and extend sufficiently close to the hub to prevent any possibility of the spokes escaping from their positions between the plates 7 and 8. The plate 7 is formed integrally with the rim 1 while the plate 8 is shown as formed separately from the rim and fastened thereto by bolts 9 or the equivalent thereof. It will of course be understood, however, that the plate 8 may be duplicated at the opposite side of the rim so that both plates may be detached from the rim.

The rim 1 is provided on its inner face and extending radially inward therefrom with spring holding lugs 10, the latter lying between the plates 7 and 8. Each of said lugs is formed with two substantially radial sockets or recesses 11 in which are fitted and secured the outer end portions of a pair of leaf springs 12. The springs 12 of each pair diverge along curvilinear lines as they approach the hub of the wheel and each of said springs is formed at its inner extremity with a friction or abutment shoe 13 which bears against one side of an adjacent spoke, each of the spokes 5 being provided with flat opposite sides to coöperate with the friction shoes 13 which have flat working faces to coöperate with the corresponding faces of the interposed spoke 5.

In order to admit of the full necessary flexure of the springs or resilient members 12, the inner ends of the sockets 11 are flared or rounded in opposite directions as indicated at 14. When a spring 12 is flexed in such manner as to cause it to assume a substantially straight and radial position, said spring is backed up and supported by the intervening wedge shaped portion 15 of the lug 10.

From the foregoing description taken in connection with the accompanying drawings it will now be understood that the hub, including the spokes carried thereby, is yieldingly or resiliently supported by the spring members 12, all of which contribute to sustain the hub in a central position within the rim 1 and return said hub to a central position after it has been out of the center. All of the springs 12 thus contribute to yieldingly support the load imposed on the axle and wheel. If the wheel be used as a driving or traction wheel, the springs 12 will serve as a resilient driving connection between the hub and rim while the lugs 10 will limit the relative rotative movement of the hub and rim in time to prevent the undue bending or breaking of the springs. It will also be observed that the wheel may be driven in either direction as each spoke 5 lies or projects between two adjacent lugs 10 and it must therefore be limited in its movement by one or the other of said lugs according to the direction in which driving power is applied to the wheels.

I claim:

1. In a resilient wheel, the combination of a hub, spokes having a rigid relation thereto and extending radially therefrom and each having substantially flat working faces, said spokes terminating short of the rim, a tire carrying rim freely encircling the hub and extremities of the spokes, lugs arranged at intervals on the inner face of the rim and each formed with a plurality of spring receiving sockets, leaf springs having portions thereof held in said sockets and having their inner portions diverging on curvilinear lines and provided at their free extremities with friction shoes, each of the spokes being frictionally held between a pair of said shoes, and annular housing plates inclosing said lugs and portions of the springs and also overlapping the end portions of the spokes to prevent relative lateral movement between the hub and rim.

2. In a resilient wheel, the combination of a hub, spokes having a rigid relation thereto and extending radially therefrom and each having substantially flat working faces, said spokes terminating short of the rim, a tire carrying rim freely encircling the hub and extremities of the spokes, lugs arranged at intervals on the inner faces of the rim and each formed with a plurality of spring receiving sockets, leaf springs having portions thereof held in said sockets and having their inner portions diverging on curvilinear lines and provided at their free extremities with friction shoes, each of the spokes being frictionally held between a pair of said shoes, and annular housing plates inclosing said lugs and portions of the springs and also overlapping the end portions of the spokes to prevent relative lateral movement between the hub and rim, each of the spokes having its outer end portion positioned and working between the housing plates and adjacent lugs and adapted to be limited in its circumferential movement in both directions by said lugs.

In testimony whereof I affix my signature.

JOHN JOHNSON.

Copies of this patent may be obtained for five cents each, by addressing the "Commissioner of Patents, Washington, D. C."